UNITED STATES PATENT OFFICE.

AIJI MATSUO, OF SAN FRANCISCO, CALIFORNIA.

RICE FOOD PRODUCT.

1,248,884. Specification of Letters Patent. Patented Dec. 4, 1917.

No Drawing. Application filed April 18, 1917. Serial No. 162,932.

*To all whom it may concern:*

Be it known that I, AIJI MATSUO, a Japanese subject, residing at San Francisco, in the county of San Francisco, State of California, have invented a new and useful Rice Food Product, of which the following is a specification in such full and clear terms as will enable those skilled in the art to construct and use the same.

This invention relates to a food product made from rice, and its object is to produce a product which is capable of being kept indefinitely, and which is ready for use at any time.

Another object of the invention is to produce a food product from rice which will be free from cane sugar and easily digestible, while at the same time having such a pleasantly sweet taste as to be exceedingly palatable.

Another object of the invention is to produce a rice cake which is capable of being popped or expanded to many times the original volume of the constituents, thereby insuring an exceedingly light feathery product.

The product is made from the treated dry rice product by any well known method of cooking such as heating in a corn popper, oven, or in hot grease, as may be desired.

The prepared rice flake is composed of seventy pounds of glutinous rice mixed with twenty pounds of a rice jelly made as described herein.

The rice jelly is first produced by mixing thirty pounds of glutinous rice, three pounds of barley malt and nine gallons of water.

The rice for the jelly is first washed several times in fresh water and soaked about twelve hours. After being soaked, it is placed in a boiler and cooked thoroughly for several hours. After the rice has been cooked, it is placed in a wooden tub and covered with warm water at about 110 degrees Fahrenheit. It is then thoroughly stirred and mixed with the malt. The tub is then covered and placed in a warm room for eight hours. At the end of this period the rice and liquid is strained through a cloth bag. The liquid produced may be cooked down to any desired consistency, and has a pleasant sweet taste, is very digestible and is very nutritious.

It is much superior to corn glucose when used in candies.

The rice is washed several times in fresh water, then soaked for fifteen hours and placed in a steamer and cooked for 50 minutes. After being cooked, it is placed in a mortar and is rubbed and macerated for about forty minutes. After the rice has been thoroughly rubbed, it is mixed with the rice jelly previously mentioned, and is again rubbed until a smooth pasty mass is produced.

After being treated as above, the rice mass is spread out in thin sheets and allowed to dry slowly. It may then be cut or broken into small pieces and is ready for puffing or popping. When so dried the rice cake may be kept for an indefinite length of time.

The hard cakes may be cooked by popping in an oven, or corn popper, or may be cooked in hot grease, as may be desired.

The advantage of this process of preparing the rice lies in the fact that when popped the product is of at least fifteen times the original volume and far lighter than any other rice product of this character.

It has also been found that about one gallon of Japanese sake, or rice wine, may be added to the mass referred to, when being macerated, with a considerable increase in the volume of the popped cake produced.

While the rice jelly made as above is a most satisfactory ingredient, corn glucose may take the place of a part of the rice jelly, in which event ten pounds of glucose may take the place of ten pounds of the rice jelly.

The finished product may contain as ingredients in the manner set forth herein, rice, rice jelly, made with barley malt, glucose and Japanese sake, although it may contain only the rice and rice jelly necessary to make the cakes.

Having thus described my invention, what I claim as new and desire to secure by Letters Patent of the United States, is as follows, express reservation being made of permissible modifications:—

1. A food product consisting of cooked rice fermented with barley malt, the solid particles being removed from the liquid by straining.

2. A food product consisting of cooked rice macerated with barley malt and dried.

3. A food product consisting of cooked rice fermented with barley malt, then macerated with an additional quantity of cooked rice, and then dried in thin flakes.

4. A food product consisting of cooked rice macerated with a barley malt rice jelly and dried to produce thin flakes.

5. A food product consisting of cooked rice macerated with rice jelly and dried to produce thin flakes, said flakes being then cooked to expand them to a considerable volume.

6. A food product consisting of rice cooked and then macerated with barley malt rice jelly and glucose, the mass being dried in thin flakes.

7. The method of making a rice cake which consists in cooking glutinous rice, adding a rice jelly thereto, macerating the mass until a smooth paste is produced, and then drying the mass in thin flakes.

8. The method of making a rice cake which consists in cooking glutinous rice, adding a rice and malt paste thereto, rubbing the mass to a smooth consistency, drying the mass in thin flakes, and then expanding the flakes by further cooking.

9. The method of making a food product which consists in cooking and macerating rice and barley malt until a jelly like substance is produced.

10. The method of making a food product which consists in macerating cooked rice with a rice jelly formed of rice and barley malt and drying the resultant mass in flakes.

11. The method of making a food product which consists in cooking and macerating barley malt and rice, adding Japanese sake and drying the resultant mass in flakes, then expanding the flakes by dry cooking.

12. The method of making a food product which consists in cooking glutinous rice, adding barley malt rice jelly, Japanese sake and glucose thereto macerating the mass and then drying it in flakes.

In testimony whereof I have hereunto set my hand this 12th day of April, A. D. 1917.

AIJI MATSUO.